United States Patent

Sakakibara et al.

Patent Number: 6,021,359
Date of Patent: Feb. 1, 2000

[54] METHOD AND APPARATUS FOR DETERMINING AN INSPECTION SCHEDULE FOR A PRODUCTION LINE

[75] Inventors: Takako Sakakibara; Yoichi Togashi; Yukihiro Muraoka, all of Yamagata, Japan

[73] Assignee: NEC Corporation, Japan

[21] Appl. No.: 08/920,466

[22] Filed: Aug. 29, 1997

[30] Foreign Application Priority Data

Aug. 29, 1996 [JP] Japan ................................. 8-228743

[51] Int. Cl.[7] ................................ G06F 19/00; G06G 7/66
[52] U.S. Cl. ........................... 700/108; 700/109; 700/110; 700/105
[58] Field of Search .................... 364/468.15, 468.06, 364/474.04, 474.15, 474.16, 474.17; 219/69.17

[56] References Cited

U.S. PATENT DOCUMENTS 5,008,842  4/1991  Nagai et al. .................. 364/551.01
5,255,181  10/1993 Chapman et al. ................ 364/401
5,539,652  7/1996  Tegethoff ...................... 364/490
5,691,906  11/1997 Togashi et al. ................. 364/468.15

*Primary Examiner*—William Grant
*Assistant Examiner*—Victoria Robinson
*Attorney, Agent, or Firm*—Ostrolenk, Faber, Gerb & Soffen, LLP

[57] ABSTRACT

In a check schedule decision method, after simulating the production line to produce a time-varying number of in-process workpieces in a designated process unit, a check-available time period for the designated process unit is detected based on a comparison of the time-varying number of in-process workpieces to a predetermined level. Further, the production line is simulated under a constraint that the designated process unit is stopped operating during the check-available time period to produce a simulated output of the production line being simulated. When the simulated output is not smaller than a predetermined target figure, a check schedule of the designated process unit is decided within the check-available time period.

22 Claims, 4 Drawing Sheets

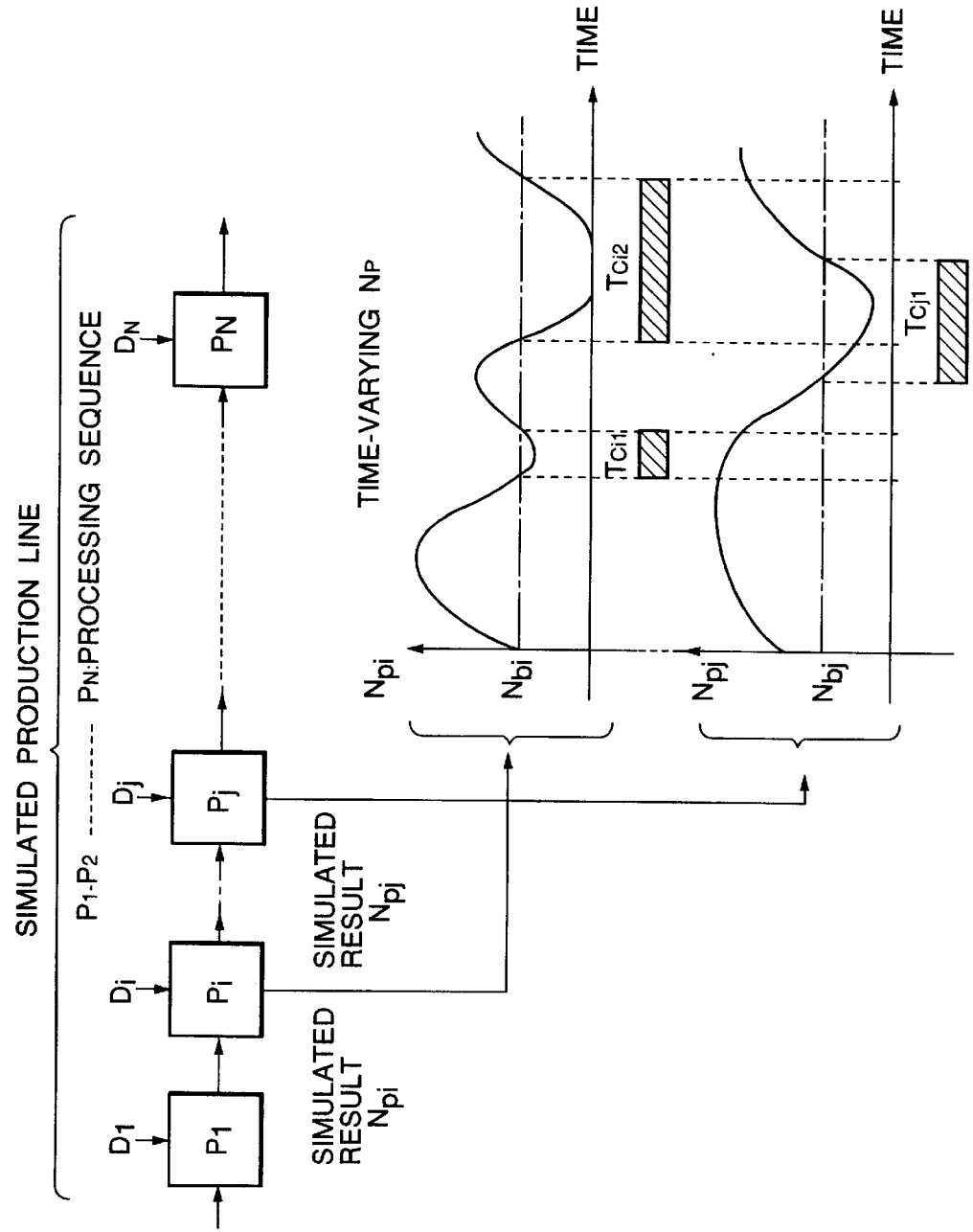

METHOD AND APPARATUS FOR DETERMINING AN INSPECTION SCHEDULE FOR A PRODUCTION LINE

BACKGROUND OF THE INVENTION

1. Field of the Invention

The present invention generally relates to management of a production line including a plurality of process units, and in particular to a method for deciding an inspection schedule of the process units.

2. Description of the Related Art

A production line having a plurality of process units arranged in series must be periodically checked for proper and stable operation. Since a process unit must stop operating in order to be checked, it is very important to decide upon an inspection schedule of the process units so that an output of the production line is not decreased by a large amount.

Conventionally, a simulation technique is used to decide such upon an on schedule. More specifically, a model of the production line is created by adding many constraints and then a managing operator explores the model's behavior displayed on screen, that is, a change of the number of in-process workpieces in the simulated production line. Based on the time-varying number of in-process workpieces, the managing operator decides the inspection schedule of the process units.

However, such a model is only as good as its input constraint data. If the input constraint data is not correct, the model does not accurately mimic the behavior of the real-world production line being simulated. In the case where the simulation is performed without consideration of the speed of workpieces conveyed, for example, the time-varying number of in-process workpieces substantially departs from that of the real-world production line, resulting in reduced reliability in line control.

SUMMARY OF THE INVENTION

An object of the present invention is to provide a method which decides a checking schedule so as to provide reliable and stable operation of a production line even while some process units are being checked.

Another object of the present invention is to provide a method which determine a checking schedule so as to provide an acceptable output while maintaining an acceptable number of in-process workpieces in a production line even while some process units are being checked.

According to the present invention, after simulating the production line to produce a time-varying number of in-process workpieces in a designated process unit, an available checking time period for the designated process unit is detected based on a comparison of the time-varying number of in-process workpieces versus a predetermined level. Further, the production line is simulated under a constraint that the designated process unit is stopped operating during the available checking time period to produce a simulated output of the production line being simulated. When the simulated output is not smaller than a predetermined target figure, a check schedule of the designated process unit is decided within the available checking time period.

In the case where a plurality of available checking time periods are detected for the designated process unit, it is preferable that the production line is simulated under a constraint that the designated process unit is stopped operating during a selected available checking time period while sequentially selecting the available checking time periods until the simulated output obtained by this step is not smaller than the predetermined target figure.

BRIEF DESCRIPTION OF THE DRAWINGS

FIG. 4 is a schematic diagram showing an example of simulation result to explain an operation of the embodiment.

DETAILED DESCRIPTION OF THE PREFERRED EMBODIMENTS

Figure 1:
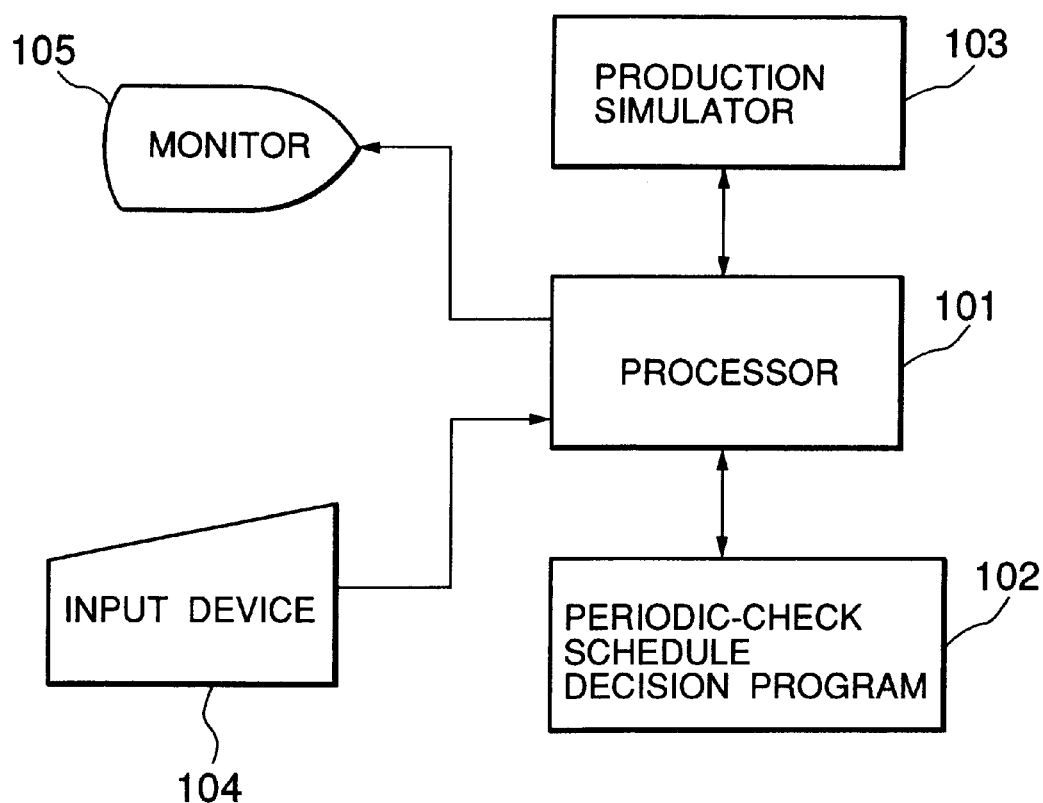
FIG. 1 is a schematic block diagram showing an embodiment of an inspection scheduler according to the present invention.

Referring to FIG. 1, there is shown a periodic-inspection scheduler which uses a simulation technique to decide on an inspection schedule of process units arranged in series forming a production line. In the periodic-inspection scheduler, a processor 101 such as a CPU runs a periodic-inspection schedule decision program stored in a memory 102 while using a production line simulator 103, as will be described later. Needless to say, a simulation program of the production line simulator 103 may be incorporated into the periodic-inspection schedule decision program stored in the memory 102.

An input device 104 is used to input production line data required for the simulation and a monitor 105 displays the result of a periodic-inspection schedule decided by the program on screen. The production line data includes a maximum capacity and a processing time of each process unit, the processing sequence of the process units, the number of workpieces to be processed, the number of in-process workpieces in each process unit, and a target output of the production line.

The descriptions of first and second embodiments of the inspection-schedule decision method according to the present invention will be described hereinafter referring to FIGS. 2–4.

FIRST EMBODIMENT

Figure 2:
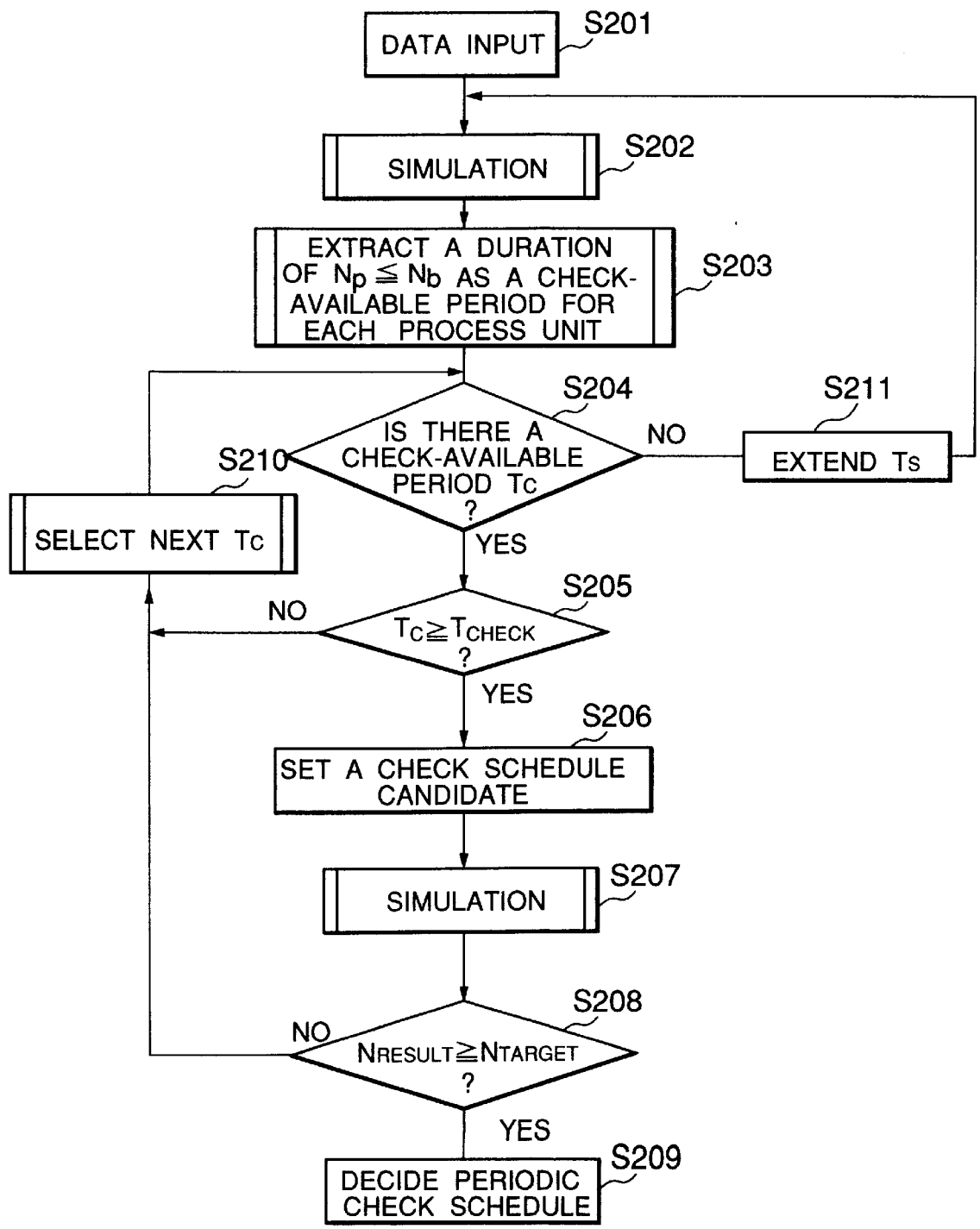
FIG. 2 is a flowchart showing an embodiment of an inspection schedule decision method according to the present invention.

Referring to FIG. 2, the above production line data together with a simulation period Ts and designation data for designating at least one process unit to be checked are input by the managing operator through the input device 104 (step S201). When receiving the above data, the processor 101 starts the production line simulator 103 performing the simulation using the production line data in the designated simulation period Ts (step S202).

The simulator 103 returns the time-varying number Np of in-process workpieces in each process unit and an output $N_{RESULT}$ of the simulated production line to the processor 101. Based on the time-varying number Np of in-process workpieces in each process unit, the processor 101 extracts a time period Tc during which the time-varying number Np is not greater than a predetermined value Nb which is X% of an average of number of workpieces which would be processed by each process unit to be checked (step S203). For example, the value Nb is set to 10% of an average of number of processed workpieces a day in each process unit.

In the first embodiment, a single process unit is designated as a process unit to be checked. As a matter of practicality, it is useful to decide the checking period of a single process unit in the production line. More specifically, in the case where the number Np of in-process workpieces in a single process unit varies with time as shown in FIG. 3, the processor 101 compares Np with Nb and, in this case, extracts two time periods $Tc_1$ and $Tc_2$ within the simulation period Ts. There may be cases where such a time period is not found. These time periods $Tc_1$ and $Tc_2$ are used as available checking periods or candidate periods in the following steps.

If there is at lease one check-available period within the simulation period Ts (YES in step S204), one available checking period Tc is selected and then it is determined whether the available checking period Tc is equal to or longer than the checking time $T_{CHECK}$ required to check that process unit (step S205). When $Tc \geq T_{CHECK}$ (YES in step S205), the checking period of the process unit is set to the available checking period Tc (step S206) and then the simulation is performed under that constraint (step S207). In other words, under the constraint that the process unit is stopped operating during the check time $T_{CHECK}$ within the available checking period Tc, the simulation of the production line is performed again by the simulator 103.

The simulator 103 returns a simulated output $N_{RESULT}$ of the production line to the processor 101. If the simulated output $N_{RESULT}$ is equal to or greater than the target output $N_{TARGET}$ (YES in step S208), the check time $T_{CHECK}$ of the process unit is determined within the available checking period Tc and is displayed on the monitor 105 (step S209).

On the other hand, when $Tc < T_{CHECK}$ (NO in step S205) or when $N_{RESULT} < N_{TARGET}$ (NO in step S208), a subsequent available checking period is selected (step S210) and then control goes back to the step S204. Further, if there is no available checking period within the simulation period Ts (NO in step S204), the simulation period Ts is extended (step S211) and the simulation is performed again for the extended simulation period Ts.

Figure 3:
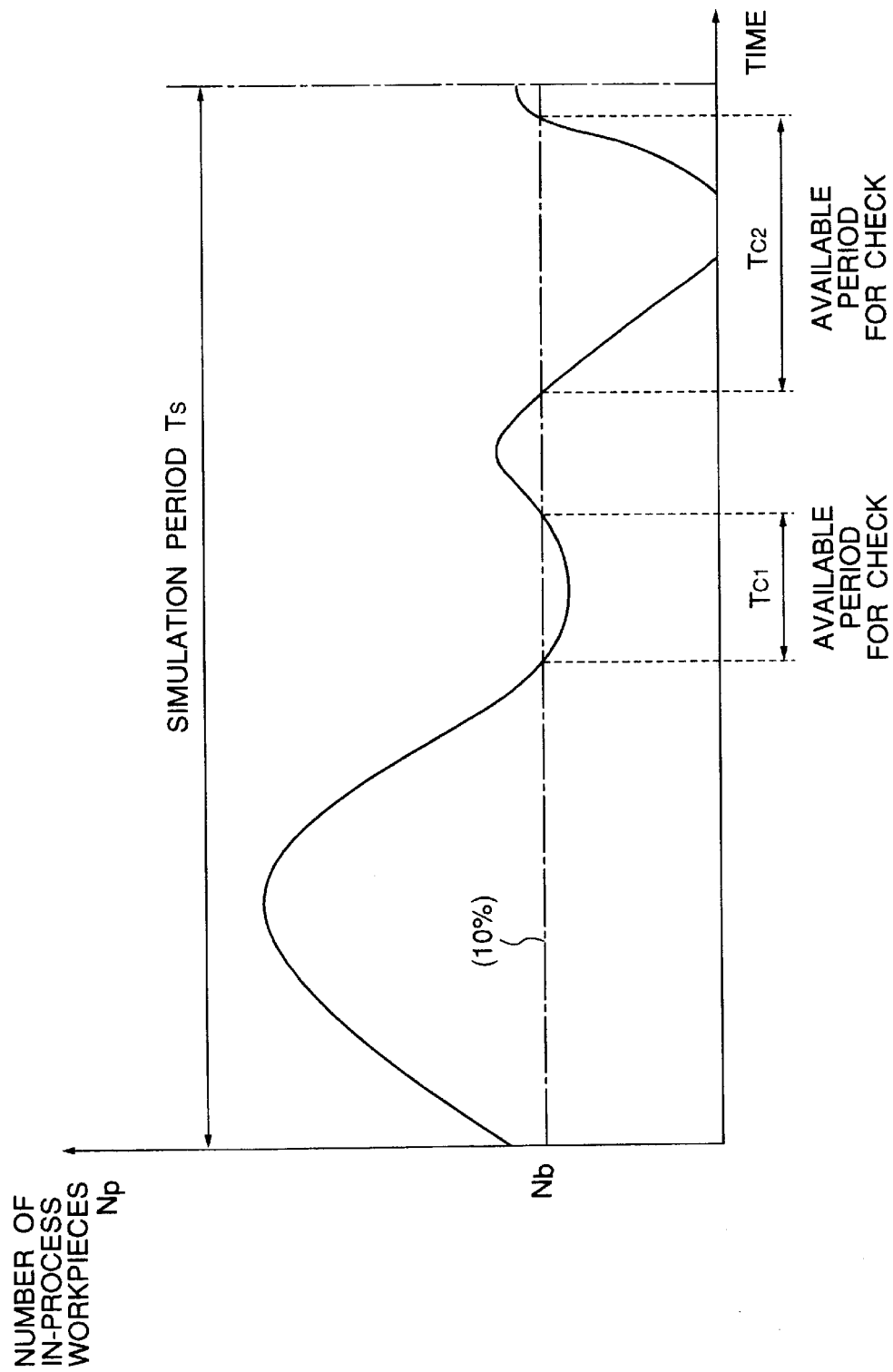
FIG. 3 is a waveform diagram showing an example of the time-varying number of in-process workpieces in the embodiment.

In FIG. 3, for example, if the time period $Tc_1$ is shorter than $T_{CHECK}$ or if $N_{RESULT} < N_{TARGET}$ for the time period $Tc_1$, another time period $Tc_2$ is selected and the above steps S204–S209 are performed for the time period $Tc_2$. Further, since the available checking period Tc is selected so that the time-varying number Np is smaller than the predetermined value Nb which is 10% of an average number of workpieces which would be processed by the process unit (step S203), the effect of the inspection on an output of the production line would be small. Especially, since the time period $TC_2$ provides a lower Np than the time period $Tc_1$, a better balance of the number of in-process workpieces and a better output would be obtained, resulting in reliable and stable operation of the production line.

SECOND EMBODIMENT

As shown in FIG. 4, an available checking period Tc may be obtained for each of a plurality of process units to be checked. It is assumed for simplicity that two process units $P_i$ and $P_j$ of the process units $P_1$–$P_N$ are designated as a process unit to be checked in simulation.

In the second embodiment, when receiving the respective time-varying numbers $N_i$ and $N_j$ of in-process workpieces in the process units $P_i$ and $P_j$ from the simulator 103, the processor 101 compares $Np_i$ with $Nb_i$ and extracts time periods $Tc_{i1}$ and $Tc_{i2}$ as described before. Similarly, the processor 101 compares $Np_j$ with $Nb_j$ and extracts a time period $Tc_{j1}$. Therefore, if these time periods satisfy the conditions of steps S204 and S205 of FIG. 2, two checking schedule candidates are obtained, that is, a first checking schedule candidate of $Tc_{i1}$ and $Tc_{j1}$ and a second checking schedule candidate of $Tc_{i2}$ and $Tc_{j1}$.

Subsequently, the processor 101 performs the simulation under the constraint of the first checking schedule candidate of $Tc_{i1}$ and $Tc_{j1}$. In other words, under the constraint that the process units $P_i$ and $P_j$ are stopped operating during the check time $T_{CHECKi}$ within the check-available period $Tc_{i1}$ and the check time $T_{CHECKj}$ within the check-available period $Tc_{j1}$, respectively, the simulation of the production line is performed again by the simulator 103. If the simulated output $N_{RESULT}$ is equal to or greater than the target output $N_{TARGET}$, the first checking schedule of $T_{CHECKi}$ and $T_{CHECKj}$ is determined.

On the other hand, if the simulated output $N_{RESULT}$ is smaller than the target output $N_{TARGET}$, the second checking schedule candidate of $Tc_{i2}$ and $Tc_{j1}$ is selected, and then the simulation under that constraint is performed. When there is no checking schedule candidate, the simulation period Ts is extended and the above steps will be repeated until the simulated output $N_{RESULT}$ is equal to or greater than the target output $N_{TARGET}$.

What is claimed is:

1. A method for deciding an inspection schedule of at least one process unit included in a production line, comprising the steps of:
    a) simulating the production line to produce a time-varying number of in-process workpieces in a designated process unit;
    b) detecting an available checking time period for the designated process unit based on a comparison of the time-varying number of in-process workpieces versus a predetermined level, and based on a predetermined checking time required to check the designated process unit;
    c) simulating the production line under a constraint that the designated process unit is stopped operating during the available checking time period to produce a simulated output of the production line being simulated; and
    d) deciding an available checking schedule of the designated process unit within the available checking time period when the simulated output is not smaller than a predetermined target figure.

2. The method according to claim 1, wherein the step b) comprises:
    comparing the time-varying number of in-process workpieces versus the predetermined level;
    detecting a time period during which the time-varying number of in-process workpieces is not greater than the predetermined level; and
    determining the time period as the available checking time period when the time period is not shorter than said predetermined checking time required to check the designated process unit.

3. The method according to claim 1, wherein
    the step b) detects a plurality of available checking time periods for the designated process unit;
    the step c) simulates the production line under a constraint that the designated process unit is stopped operating during one selected from the plurality of available checking time periods to produce a simulated output of the production line being simulated; and
    the step d) decides a checking schedule of the designated process unit corresponding to the selected one of the available checking time periods when the simulated output is not smaller than the predetermined target figure.

4. The method according to claim 3, further comprising the steps of:

e) repeating the steps c) and d) while sequentially selecting the available checking time periods until the simulated output obtained by the step c) is not smaller than the predetermined target figure.

5. The method according to claim 3, wherein the step b) comprises:

comparing the time-varying number of in-process workpieces versus the predetermined level;

detecting a plurality of time periods during each of which the time-varying number of in-process workpieces is not greater than the predetermined level; and determining a time period as the available checking time period when the time period is not shorter than a predetermined checking time required to check the designated process unit.

6. The method according to claim 5, wherein the available checking time period is determined by comparing the time period to the predetermined checking time while sequentially selecting the time period from the plurality of time periods.

7. The method according to claim 1, further comprising the steps of:

extending a simulation period during which the step a) is performed when an available checking time period is not detected in the step b); and repeating the step b) until at least one available checking time period is detected.

8. The method according to claim 1, wherein, in the step b), the predetermined level is 10% an average of number of in-process workpieces a day in the designated process unit.

9. The method according to claim 1, wherein steps a) to d) are performed by a computer under control of a program stored in a memory of the computer.

10. A method for deciding an inspection schedule of a plurality of process units included in a production line, comprising the steps of:

a) simulating the production line to produce a time-varying number of in-process workpieces in each of the process units;

b) detecting an available checking time period based on a comparison of the time-varying of in-process workpieces versus a predetermined level for each process unit, and based on a predetermined checking time required to check the designated process unit;

c) simulating the production line under a constraint that each process unit is stopped operating during the available checking time period therefor to produce a simulated output of the production line being simulated; and d) deciding an available checking schedule of each process unit within the available checking time period therefor when the simulated output is not smaller than a predetermined target figure.

11. The method according to claim 10, wherein the step b) comprises:

comparing a time-varying number of in-process workpieces versus a predetermined level for each process unit;

detecting a time period during which the time-varying number of in-process workpieces is not greater than the predetermined level; and determining the time period as the available checking time period when the time period is not shorter than said predetermined checking time required to check the process unit.

12. The method according to claim 10, wherein the step b) detects a plurality of available checking time periods for each process unit;

the step c) simulates the production line under a constraint that each process unit is stopped operating during one selected from the available checking time periods to produce a simulated output of the production line being simulated; and the step d) decides an available checking schedule of each process unit within the selected one of the available checking time periods when the simulated output is not smaller than the predetermined target figure.

13. The method according to claim 12, further comprising the steps of:

e) repeating the steps c) and d) while sequentially selecting the available checking time periods until the simulated output obtained by the step c) is not smaller than the predetermined target figure.

14. The method according to claim 12, wherein the step b) comprises:

comparing a time-varying number of in-process workpieces to a predetermined level in each process unit;

detecting a plurality of time periods during each of which the time-varying number of in-process workpieces is not greater than the predetermined level; and determining a time period as an available checking time period when the time period is not shorter than the predetermined checking time.

15. The method according to claim 14, wherein the available checking time period is determined by comparing the time period to the predetermined checking time while sequentially selecting the time period from the time periods.

16. The method according to claim 10, further comprising the steps of:

extending a simulation period during which the step a) is performed when an available checking time period is not detected in the step b); and repeating the step b) until at least one available checking time period is detected.

17. The method according to claim 10, wherein, in the step b), the predetermined level is 10% an average of number of in-process workpieces a day in each process unit.

18. The method according to claim 10, wherein steps a) to d) are performed by a computer under control of a program stored in a memory of the computer.

19. An inspection scheduler for at least one process unit included in a production line, comprising:

a simulator for simulating the production line under a constraint to produce a time-varying number of in-process workpieces in a designated process unit and a simulated output of the production line being simulated;

a detector for detecting an available checking time period for a designated process unit based on a comparison of the time-varying number of in-process workpieces versus a predetermined level, and based on a predetermined checking time required to check the designated process unit; and a controller for controlling the simulator such that the simulator simulates the production line under a constraint that the designated process unit is stopped operating during the available checking time period to produce a simulated output of the production line, and for deciding a checking schedule of the designated process unit within the available checking time period when the simulated output is not smaller than a predetermined target figure.

20. An inspection scheduler for a plurality of process units included in a production line, comprising:

a simulator for simulating the production line under a constraint to produce a time-varying number of in-process workpieces in each of the process units and a simulated output of the production line being simulated;

a detector for detecting an available checking time period based on a comparison of the time-varying number of in-process workpieces versus a predetermined level for each process unit, and based on a predetermined checking time required to check the designated process unit; and a controller for controlling the simulator such that the simulator stimulates the production line under a constraint that each process unit is stopped operating during the available checking time period to produce a simulated output of the production line and for deciding a checking schedule of each process unit within the available checking time period when the simulated output is not smaller than a predetermined target figure.

21. A storage medium storing a program for causing a computer to decide an inspection schedule of at least one process unit included in a production line, by carrying out the steps of:

a) simulating the production line to produce a time-varying number of in-process workpieces in a designated process unit;

b) detecting an available checking time period for the designated process unit based on a comparison of the time-varying number of in-process workpieces versus a predetermined level, and based on a predetermined checking time required to check the designated process unit;

c) simulating the production line under a constraint that the designated process unit is stopped operating during the available checking time period to produce a simulated output of the production line being simulated; and d) deciding an available checking schedule of the designated process unit within the available checking time period when the simulated output is not smaller than a predetermined target figure.

22. A storage medium storing a program for causing a computer to decide an inspection schedule of a plurality of process units included in a production line, by carrying out the steps of:

a) simulating the production line to produce a time-varying number of in-process workpieces in each of the process units;

b) detecting an available checking time period based on a comparison of the time-varying of in-process workpieces versus a predetermined level for each process unit, and based on a predetermined checking time required to check the designated process unit;

c) simulating the production line under a constraint that each process unit is stopped operating during the available checking time period therefor to produce a simulated output of the production line being simulated; and d) deciding an available checking schedule of each process unit within the available checking time period therefor when the simulated output, is not smaller than a predetermined target figure.

* * * * *